(12) United States Patent
Wiesenberg et al.

(10) Patent No.: US 11,439,136 B2
(45) Date of Patent: Sep. 13, 2022

(54) AUTOMATED PEST WARNING AND ERADICATION SYSTEM

(71) Applicant: Toyota Motor Engineering And Manufacturing North America, Inc., Plano, TX (US)

(72) Inventors: Ryan M. Wiesenberg, Ann Arbor, MI (US); Emily S. Lerner, Brighton, MI (US); Mahendra T. Kute, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 335 days.

(21) Appl. No.: 16/846,036

(22) Filed: Apr. 10, 2020

(65) Prior Publication Data

US 2021/0315192 A1 Oct. 14, 2021

(51) Int. Cl.
| | |
|---|---|
| *A01M 1/20* | (2006.01) |
| *G06N 20/00* | (2019.01) |
| *G06N 5/04* | (2006.01) |
| *A01M 29/30* | (2011.01) |
| *A01M 29/12* | (2011.01) |
| *A01M 1/22* | (2006.01) |
| *G07C 5/08* | (2006.01) |

(52) U.S. Cl.
CPC .............. *A01M 1/20* (2013.01); *A01M 1/223* (2013.01); *A01M 1/226* (2013.01); *A01M 29/12* (2013.01); *A01M 29/30* (2013.01); *G06N 5/04* (2013.01); *G06N 20/00* (2019.01); *G07C 5/0808* (2013.01)

(58) Field of Classification Search
CPC ......... G06N 20/00; G06N 5/04; A01M 1/223; A01M 1/226; A01M 29/12; A01M 29/30; G07C 5/0808
USPC ....................................................... 43/132.1
See application file for complete search history.

(56) References Cited

U.S. PATENT DOCUMENTS

| 5,968,401 A * | 10/1999 | Roy ....................... A01M 1/226 43/132.1 |
| 7,837,932 B2 | 11/2010 | Hedman |
| 8,400,348 B1 * | 3/2013 | Guice ...................... G01S 13/88 235/404 |
| 10,729,124 B2 * | 8/2020 | Marka ..................... G01S 17/04 |
| 2011/0064605 A1 * | 3/2011 | Hedman ............. A01M 1/2094 422/1 |
| 2012/0060407 A1 * | 3/2012 | Lindsey .................. A01M 1/20 43/124 |

(Continued)

FOREIGN PATENT DOCUMENTS

| CN | 1065775596 A | 4/2017 |
| KR | 20110138511 A | 12/2011 |

*Primary Examiner* — William D Titcomb
(74) *Attorney, Agent, or Firm* — Jordan IP Law, LLC

(57) ABSTRACT

Apparatuses, methods and systems provide technology to detect a pest-related fault or failure of an electronic control unit (ECU). The technology may also detect a presence of one or more pests via cameras, LiDAR sensors, RADAR sensors, motion sensors, one or more sound sensors, or one or more heat sensors. The technology may also provide countermeasures to disable, remove or eradicate the pests from the vehicle. The countermeasures may include one or more of a laser to target small pests, an electrical discharge insect control system to exterminate insects, and a vibration or sound emission system to target rodents.

20 Claims, 5 Drawing Sheets

(56) References Cited

U.S. PATENT DOCUMENTS

| | | | |
|---|---|---|---|
| 2015/0084751 A1* | 3/2015 | Crawford | A01M 29/18 340/384.2 |
| 2017/0020122 A1* | 1/2017 | Mirzakhani Nafchi | A01M 19/00 |
| 2017/0202202 A1* | 7/2017 | Crisp | A01M 17/00 |
| 2018/0116199 A1* | 5/2018 | Hartman | A01M 1/226 |
| 2018/0235205 A1* | 8/2018 | Howard | A01M 23/30 |
| 2018/0303079 A1* | 10/2018 | Marka | A01M 1/026 |
| 2019/0000059 A1 | 1/2019 | Marka | |
| 2019/0008136 A1* | 1/2019 | Marka | A01M 1/026 |
| 2020/0019765 A1* | 1/2020 | Ampatzidis | G06N 3/08 |
| 2020/0068866 A1* | 3/2020 | Taylor | A01G 7/06 |

* cited by examiner

AUTOMATED PEST WARNING AND ERADICATION SYSTEM

TECHNICAL FIELD

Embodiments generally relate to vehicle controls. More particularly, embodiments relate to the detection and eradication of pests within or proximate a vehicle.

BACKGROUND

Modern vehicles utilize extensive electrical systems to control and manage various vehicle functions. The electrical systems often include an electric control unit (ECU) that control one or more of the electrical systems or subsystems in the vehicle. Some modern vehicles include numerous ECUs, often seventy-five (75) or more. The systems and subsystems controlled by the ECUs include critical safety systems. Damage to an ECU may lead to short-circuits, errors or malfunctions of the systems or subsystems which may present safety hazards. Damage to the ECUs are often caused by pests and rodents including, for example, ants, mosquitos, spiders, squirrels, rats, mice, snakes, and the like. Due to the critical functions performed by the ECUs, preventing damage to the ECUs is important to maintaining a properly and safely functioning vehicle. Further, pests and rodents may also present a safety hazard by distracting or frightening the driver of the vehicle. Detecting the presence of pests and alerting the driver may also help to avoid unsafe conditions.

BRIEF SUMMARY

In one embodiment, a vehicle pest detection and eradication system includes a fault detection subsystem to detect an error or failure of an electronic control unit (ECU), wherein the error or failure is determined to be consistent with a pest-related failure, a sensor detection subsystem to detect a presence of one or more pests, wherein the sensor detection subsystem includes one or more of: one or more cameras, one or more LiDAR sensors, one or more RADAR sensors, one or more motion sensors, one or more sound sensors, or one or more heat sensors, and an eradication subsystem to provide countermeasures to disable, remove or eradicate the one or more pests from the vehicle.

In another embodiment, at least one computer readable storage medium comprises a set of instructions, which when executed by a computing system, cause the computing system to detect, via a fault detection subsystem, an error or failure of an electronic control unit (ECU), wherein the error or failure is determined to be consistent with a pest-related failure, detect, via a sensor detection subsystem, the presence of one or more pests, wherein the sensor detection subsystem includes one or more of: one or more cameras, one or more LiDAR sensors, one or more RADAR sensors, one or more motion sensors, one or more sound sensors, or one or more heat sensors, and provide, via an eradication subsystem, countermeasures to disable, remove or eradicate the one or more pests from the vehicle.

In yet another embodiment, a method of operating a vehicle pest detection and eradication system includes detecting, via a fault detection subsystem, an error or failure of an electronic control unit (ECU), wherein the error or failure is determined to be consistent with a pest-related failure, detecting, via a sensor detection subsystem, the presence of one or more pests, wherein the sensor detection subsystem includes one or more of: one or more cameras, one or more LiDAR sensors, one or more RADAR sensors, one or more motion sensors, one or more sound sensors, or one or more heat sensors, and providing, via an eradication subsystem, countermeasures to disable, remove or eradicate the one or more pests from the vehicle.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
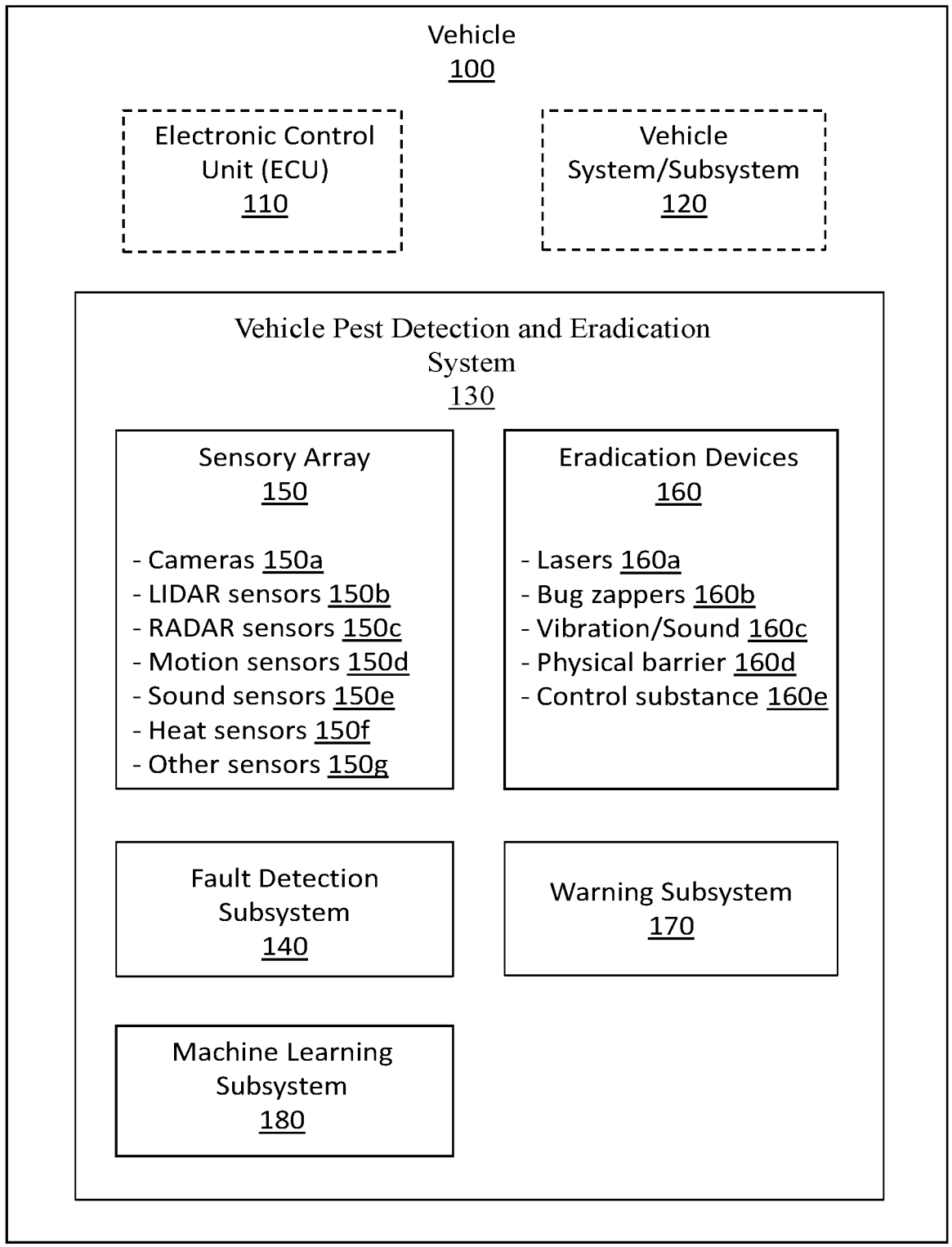
FIG. 1 is a block diagram of an example of a portion of a vehicle according to an embodiment.

Turning now to FIG. 1, a portion of a vehicle (e.g., car, taxi, shuttle, truck, van, sport utility vehicle/SUV, aircraft, etc.) 100 is shown in which a vehicle pest detection and eradication system 130 is implemented. Vehicle 100 may have one or more electronic control units (ECUs) 110 that control one or more vehicle systems or subsystems 120 (herein collectively referred to as "vehicle system(s)"). The ECUs 110 may be a module, controller, microcontroller, processor, embedded electronics system, and the like, or any combination thereof. The vehicle systems 120 may include but are not limited to, for example, an engine control unit (ECU), transmission control unit (TCU), powertrain control module (PCM), electric power steering control unit (PSCU), brake control module (BCM), anti-lock braking system (ABS), electronic slip or stability control (ESC), speed control unit (SCU), telematics control unit (TCU), human-machine interface (HMI), door control unit (DCU), battery management system (BMS), seat control unit, and the like. In at least some embodiments, the vehicle systems 120 may perform many important and/or critical operations that ensure the safe and proper operation of the vehicle 100. Vehicle systems 120 (and related electrical components) are often damaged or compromised by pests and/or rodents (not shown) (hereinafter collectively referred to as "pest(s)") including, for example, ants, mosquitos, spiders, squirrels, rats, mice, snakes, other insects and rodents, and the like, that may invade, occupy, infest, or nest in the vehicle 100. Some pests have been found to seek the shelter, cover, safety, warmth, or cooling offered within or around the vehicle 120 including within the passenger compartment and within the engine compartment. Pests have also been known to eat, gnaw, fray, bend, split, and destroy electrical components of vehicles such as an ECU 110 or a vehicle system 120, as well as associated components such as wires, cables, chips, modules, etc. Due to many factors including location and size, the damage to the ECU 110 or vehicle system 120 caused may not be readily apparent. Pests (e.g., mosquitos, ants, flying insects, etc.) have also been found to be attracted by/to occupants of vehicles (i.e., drivers and passengers), and present a nuisance by annoying and/or distracting the occupants. Accordingly, the pests present potential safety hazards. Based at least on the foregoing, quickly detecting a fault or error in the vehicle systems 120, and detecting and eradicating pests within or proximate the vehicle 120 would promote vehicle, driver and passenger safety by mitigating potential dangers.

In the illustrated example, the vehicle pest detection and eradication system 130 includes a fault detection subsystem 140, a sensor array 150, eradication devices 160, a driver warning subsystem 170, and a machine learning subsystem 180. The fault detection subsystem 140 detects an error or failure of one or more ECUs 110 or vehicle systems 120. The fault detection subsystem 140 may include, for example, fault detection technology to detect a fault or failure in one or more ECUs 110 or vehicle systems 120. The fault detection technology may be implemented in logic instructions (e.g., software), configurable logic, fixed-functionality hardware logic, etc., or any combination thereof. The fault may be a random, unexpected or abnormal condition or defect detected in an ECU 110 or vehicle system 120 (including a component or subsystem) that may lead to a failure or malfunction. A failure may be an unsatisfactory condition or state of inoperability for performing an intended function detected in an ECU 110 or vehicle system 120 (including a component or subsystem). The faults and failures may be associated with wear, abrasion, or deterioration that cause changes in the physical or electrical properties of the ECU 110 or vehicle system 120. The fault detection technology may, for example, perform a lookup of known or expected physical or electrical properties (e.g., temperature, voltage, current, charge state, resistance, etc.) and provide an alert when the physical or electrical properties are found to be inconsistent with an expected reading or are outside a known or expected range. The expected reading may be based, for example, on a predetermined threshold reading or range. The lookup may be performed periodically, continually, or upon initiation based on user preferences. In at least some examples, the lookup may also be performed manually by a user via a user interface (UI). The alert may also trigger an additional lookup of known or expected causes including conditions that are known to be consistent with pest-related damage based on the physical or electrical properties (e.g., temperature spikes, temperature fluctuations, short-circuits, partial short-circuits, voltage drops, etc.).

The sensor array 150 may include one or more of various detectors including, for example, cameras 150a, LiDAR sensors 150b, RADAR sensors 150c, motion sensors 150d, sound sensors 150e, heat sensors 150f, or other sensors 150e such as temperature, thermal, infrared (IR), ultrasonic, proximity, and the like, to detect the presence of and/or identify one or more pests. The presence of pests may be defined by a pest being detected within a designated area of the vehicle 100 (e.g., within a passenger cabin or compartment, within the engine compartment, etc.), or by a pest being detected within a pre-determined proximity to the vehicle 100 (e.g., within 5 feet, within 10 feet, within 20 feet, etc.). The sensor array 150 may be arranged throughout the vehicle 100 including in the passenger compartment, in the engine compartment, near ECUs, on the exterior of the vehicle, etc. The sensors of the sensor array 150 may be trained, focused or calibrated to detect activity at or near the ECUs 110, within the passenger compartment, at or near the entry and exit points to the passenger compartment, at or near the entry and exit points to the engine compartment or within a determined proximity of the vehicle 100 (e.g., within 5-10 feet, within 10-20 feet, within 20-30 feet, etc.) in order to detect activity of pests at or near those locations. The cameras 150a may capture an image and/or perform image recognition to identify one or more pests via a lookup database (not shown). Other known methods for performing identification may also be used. The LIDAR sensors 150b may generate three-dimensional (3D) representations (i.e., images) that may be used to compare with representations of known pests via the lookup database. The RADAR sensors 150c, motion sensors 150d, sound sensors 150e, heat sensors 150f, and other sensors 150g may also be used to detect the presence and movement of pests in a similar manner. The various sensors may be used in any number, and may be used redundantly to validate and improve the accuracy of the detection such that appropriate countermeasures may be considered and presented to the driver/user for activation.

The device array 160 may include one or more eradication devices including, for example, lasers 160a, electrical discharge insect control systems (i.e., "bug zappers") 160b, a vibration or sound emission system 160c, physical barriers (e.g., air locks) 160d, and a control substance system 160e. The eradication devices 160 may be selected based on a variety of factors including, for example, the size of the pests, location of the pests (i.e., within the passenger compartment, within the engine compartment, near an ECU, etc.), proximity of the pests to the vehicle, number of pests detected, aggressiveness of the pests (e.g., based on activity, speed, number, user input, etc.). Devices are selected to avoid causing any harm, damage or injury other than to the intended pests. Special care is to be given to prevent damage, injury, and/or discomfort to people, pets, or property (including the vehicle and any components). These aspects will be discussed further below.

Upon detection, the eradication devices 136 may be used to deter, discourage, disable, target, exterminate, remove, or eradicate the detected pests. An electrical discharge insect control system may be used, for example, upon detection, to exterminate flying insects such as mosquitoes, house flies, and the like. One or more lasers may be used, for example, upon detection, to target one or more small pests such as crawling bugs, spiders, mice, and the like. One or more of a vibration or sound emission system may be used, for example, upon detection, to target one or more large pests such as squirrels, rats, snakes, and other rodents. In at least some embodiments, the eradication devices 160 may include one or more physical barriers used to prevent pest from accessing one or more ECUs 110 or other vehicle systems 120. The physical barriers may include air locks that prevent the pests from passing through a prohibited or restricted area such as an entry point to an ECU or an entry point to an area containing an ECU. In at least some embodiments, the eradication devices 160 may include a control substance system 160e to release a substance such as a gas, liquid spray, or deterrent material in or around the vehicle. The substance may have qualities or characteristics (e.g., foul smell, induces nausea, causes irritation, etc.) that controls, discourages, deters, immobilizes, or poisons the pest. The substance is selected and delivered in a suitable strength and duration to satisfactorily remediate the detected pests without causing harm, damage or injury other than to the intended pests. The control substance system 160e may be used, for example, upon detection, of many pests (e.g., an infestation of flying pests) or a variety of pests (e.g., mosquitoes, flying insects, ants, etc.).

The eradication devices 160 are to be selected and used with special care to prevent damage, injury, and/or discomfort to people, pets, or property (including the vehicle and any components or contents of the vehicle). Further, the control substance system 160e is to be activated only after a user lockout of the vehicle is initiated including, for example, closing and locking one or more of all entry points to the vehicle as appropriate for a selected eradication including all doors, windows, engine compartment, trunk/cargo areas, and the like. Upon delivery of the control substance(s), the vehicle is to be ventilated for a period of time before the user lockout is terminated to allow the substance(s) to be completely evacuated from the passenger cabin. Other vehicle systems including an HVAC system may also be utilized to assist with removing/evacuating the substance(s) from the passenger cabin and with delivering clean, fresh air to the passenger cabin before terminating the user lockout. These aspects will be discussed further below.

The driver warning system 170 may provide a warning of the presence and severity of the one or more pests. Upon detection of pests, the driver warning system 170 may cause a warning, alert, or notification to be issued to a driver (or passenger or user) of the vehicle 100 via a display, user interface (UI), human-machine interface (HMI), or similar component. The warning may provide a general category of pests detected or specify (i.e., with particularity) the pests detected. The warning may also provide a severity of the presence of the pests detected (i.e., minor, low, moderate, high, severe, etc.). The indicated severity may correlate roughly with an infestation level within or near the vehicle, and may trigger one or more countermeasures (i.e., one or more specific remedial actions) including activating or recommending the activation of one or more of the eradication devices, and/or alerting an additional action (e.g., close all windows immediately, or take no immediate remedial action but monitor further).

The machine learning subsystem 180 may be used to improve the vehicle pest detection and eradication system 130. In at least some embodiments, the machine learning subsystem 180 may receive information from the sensor array 150, the fault detection subsystem 140, and/or warning subsystem 170. The machine learning subsystem 180 may analyze the receive information related to the location, nature, and/or severity of detected faults, detected pests, and the effectiveness of the eradication devices in order to improve the detection and eradication system 130. As an example, in response to a malfunction detected in or on an internal piece of an ECU or across several ECUs around the same location, the machine learning subsystem 180 may determine that the damage was caused by a pest and save the learned information for future use.

The machine learning system 180 may also receive information from one or more other vehicles and process the received information to determine patterns in pest populations (e.g., whether the populations are changing) in an area in which the vehicle is located (or will be located based on a planned route or lookup). Information may be received based on preferences including location (e.g., as defined by geography from address, zip code, or GPS coordinates), planned travel routes (e.g., GPS alerts), activity associated with co-owned/shared vehicles, history, news feeds, and the like. The information (i.e., received or processed information) may also be uplinked to another system for further processing to discover additional information that may be used to improve the understanding of the information. The machine learning system 180 may also warn other vehicles of the presence of pests in the area, and link to other devices such as smart phones, smart home systems, or Internet-of-Things (IoT) devices. The machine learning system 180 may thereby provide additional warnings to users and activate and/or leverage other external devices such as cameras or sensors to assist with pest detection and provide potential countermeasures for pest prevention. In at least some examples, warning may be provided to third parties including, for example, pest services, parking lot authorities, emergency services, and other users including those who may not have the system.

Figure 2:
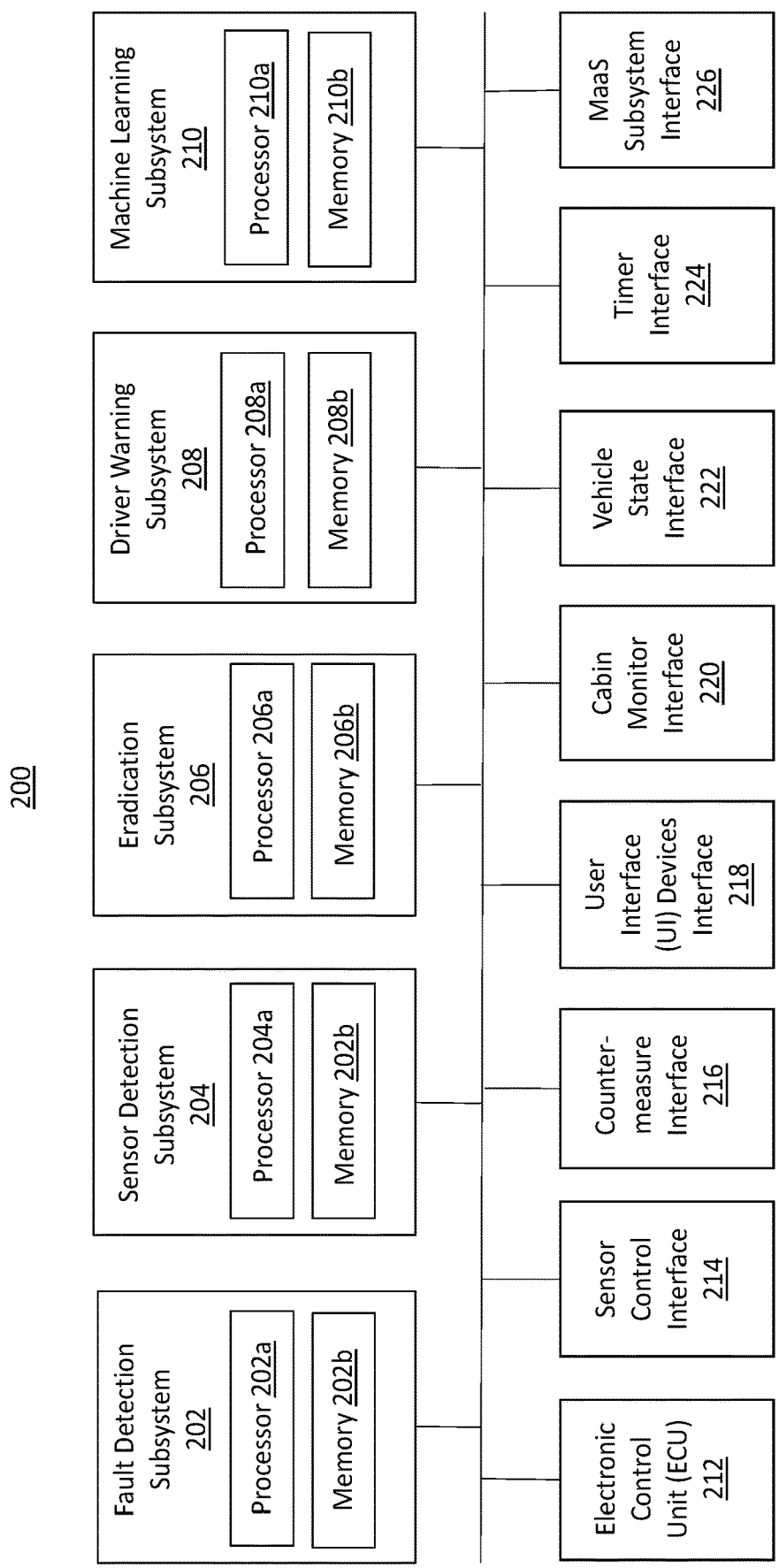
FIG. 2 is a block diagram of an example of a vehicle pest detection and eradication system according to an embodiment.

FIG. 2 provides a more detailed example of a vehicle pest detection and eradication system 200. The illustrated vehicle pest detection and eradication system 200 may be readily substituted for the vehicle pest detection and eradication system 130, as discussed above with respect to FIG. 1. In the illustrated example, the system 200 includes a fault detection subsystem 202, a sensor detection subsystem 204, an eradication subsystem 206, and a driver warning system 208, and an optional machine learning subsystem 210. The system 200 also includes an electronic control unit (ECU) 212, a sensor control interface 214, a countermeasure interface 216, a user interface (UI) device(s) interface 218, a cabin monitor interface 220, a vehicle state interface 222, a timer interface 224, and a Monitoring as a Service (MaaS) subsystem interface 226. The fault detection subsystem 202 (202a, 202b) having a processor 202a (e.g., embedded controller, central processing unit/CPU) and a memory 202b (e.g., non-volatile memory/NVM and/or volatile memory) containing a set of instructions, which when executed by the processor 202a, cause the fault detection subsystem 202 to detect a fault or failure of one or more ECUs 110 of a vehicle 100 to determine whether the fault or failure of the ECU 110 is consistent with a pest-related cause. The fault detection subsystem 202 may monitor physical and electrical properties (e.g., temperature, voltage, current, charge state, resistance, etc.) of the ECUs 212, and perform lookups of known or expected physical and electrical properties. The fault detection subsystem 202 may also provide a warning or alert to the user via the driver warning system 170, e.g., via UI devices interface 218, when the physical or electrical properties are found to be inconsistent with an expected reading or outside a known or expected range. The warning or alert may include informing the driver of the fault or failure. The waring or alert may also include information related to the drivability of the vehicle in light of the fault or failure (i.e., vehicle is drivable, vehicle is not drivable, etc.), and instructions to replace or repair a defective component, consult a repair technician or mechanic, and the like. The detection of a fault or failure may also trigger the sensor detection subsystem to determine if any pests are present in the vehicle including at or near the defective component (consistent with the discussion related to sensor detection subsystem 204 below). The lookup may be performed periodically, continually, or upon initiation based on user preferences. User preferences and alerts may also be entered and displayed via UI devices interface 218. The alert may also trigger an additional lookup of known or expected causes including conditions that are known to be consistent with pest-related damage based on the physical and electrical properties.

The sensor detection subsystem 204 (204a, 204b) having a processor 204a (e.g., embedded controller, central processing unit/CPU) and a memory 204b (e.g., non-volatile memory/NVM and/or volatile memory) containing a set of instructions, which when executed by the processor 204a, cause the sensor detection subsystem 204 to detect a presence of one or more pests. The pests may be detected within a user defined space or area defined set by user selections and settings including, for example, within a passenger cabin, within an engine compartment, at or near an ECU, within a defined proximity of the vehicle, etc. Sensor control interface 214 may receive user selections and settings related to one or more of various sensor devices (not shown) such as sensor devices of sensor array 150 including, for example, cameras 150a, LIDAR sensors 150b, RADAR sensors 150c, motion sensors 150d, sound sensors 150e, heat sensors 150f, and other sensors 150g. Activity detected by the various sensor devices may also be output to a user via a user interface (e.g., a display, user interface (UI), human-machine interface (HMI), or the like) via UI devices interface 218. The sensor selections and settings may include, for example, a frequency of readings (e.g., continual, periodic, user activated, time defined, action defined (e.g., prior to ignition activation, upon startup of engine, upon shutoff of engine, etc.), and the like. Sensor selections and settings may also define the sensitivity (e.g., ON/OFF, Low, Med, High, etc.) and operating ranges of the sensors.

The eradication subsystem 206 (206a, 206b) having a processor 206a (e.g., embedded controller, central processing unit/CPU) and a memory 206b (e.g., non-volatile memory/NVM and/or volatile memory) containing a set of instructions, which when executed by the processor 206a, cause the eradication subsystem 206 to detect a presence of one or more pests. Sensor control interface 214 may receive user selections and settings related to one or more of various sensor devices (not shown) including cameras, LiDAR sensors, RADAR sensors, motion sensors, etc. Activity detected by the various sensor devices may also be output to countermeasure interface 216 or UI devices interface 218 for presentation to the driver. The sensor selections and settings may include a frequency of readings (e.g., continual, periodic, user activated, time defined, action defined (e.g., prior to ignition activation, upon startup of engine, upon shutoff of engine, etc.), and the like. Sensor selections and settings may also define the sensitivity (e.g., ON/OFF, Low, Med, High, etc.) and operating ranges of the sensors to be used to remediate specified pests. As an example, a laser may be designated to target small pests such as crawling bugs, spiders, mice, and the like. An electrical discharge insect control system may be designated to exterminate flying insects such as mosquitoes, house flies, and the like. Vibration or sound may be used to target one or more large pests such as squirrels, rats, snakes, and/or other rodents. These sensor selections and settings are provided as examples. Other sensor selections may be set based on user preferences including combinations of sensors to provide countermeasures to remediate detected pests. The detection of pests may also cause one or more countermeasures to be provided to the driver via countermeasure interface 216 to remediate the detected pests. The countermeasures presented to driver are to be consistent with the discussion of countermeasures disclosed herein, and are to be selected to avoid unintended harm. More particularly, the countermeasure options presented to the driver include devices selected to avoid causing any harm, damage or injury other than to the intended pests. The eradication subsystem selects and uses the eradication devices 160 to prevent and remediate the detected pests while also preventing damage, injury, and/or discomfort to people, pets, or property (including to the vehicle and vehicle components).

The eradication subsystem 206 may communicate with various subsystems, components and interfaces of system 200 in order to safely and effectively perform pest detection and eradication. For example, the eradication subsystem may communicate with all components of system 200 including countermeasure interface 216, UI devices interface 218, cabin monitor interface 220, a vehicle state interface 222, a timer interface 224, and MaaS subsystem interface 226. System 200 may provide recommended countermeasures based on detected pest activity via countermeasure interface 216 and/or UI devices interface 218 for presentation to the driver or user. Countermeasure interface 216 may also allow the driver or user to provide user settings and selections related to the various eradication devices 160 (160a-160e) including, for example, device-pest countermeasure pairings (i.e., which device is to be used to remediate which pests), and eradication device safety settings (e.g., device activation, activation restrictions, vehicle lockout, timing limitations, etc.). The sensor selections and settings may include a frequency of readings (e.g., continual, periodic, user activated, time defined, action defined (e.g., prior to ignition activation, upon startup of engine, upon shutoff of engine, etc.), and the like. The cabin monitor interface 220 may communicate with various cabin sensors (not shown) such as, for example, cameras, motion sensors, microphones, seat occupancy (i.e. pressure) sensors, facial recognition sensors, seat belt sensors, and the like to determine whether the cabin of the vehicle is vacant or occupied. The vehicle state interface 222 may also communicate with various vehicle state sensors to determine an overall state of the vehicle. The sensors may include, for example, an engine controller, a transmission controller, speed sensor, an onboard electrical system, window controller, door lock controller, HVAC/ventilation system, and the like, and allow the system 200 to determine whether the engine is ON or OFF, whether the transmission is in drive or is parked, the speed of the vehicle, whether the windows are up or down, and whether the cabin is being ventilated by the HVAC system, as well as other vehicle state inputs that might affect the ability and appropriateness of perform pest remediation. The timer interface 224 may also communicate with various system components to provide timing control functions related to the subsystems 202-210 and interfaces 216-226.

The driver warning subsystem 208 (208a, 2048) having a processor 208a (e.g., embedded controller, central processing unit/CPU) and a memory 208b (e.g., non-volatile memory/NVM and/or volatile memory) containing a set of instructions, which when executed by the processor 208a, cause the sensor detection subsystem 208 to detect a presence of one or more pests. Upon detection of a fault or failure by the fault detection subsystem 202, and/or upon the detection of the presence of one or more pests by the sensor detection subsystem 204, the driver warning subsystem may provide a warning of the presence and severity of one or more pests within or proximate the vehicle 100. Upon detection of pests, the driver warning subsystem 208 may cause a warning, alert, or notification to be issued to a driver or user of the vehicle 100. The warning may be provided to the driver, for example, on a display or HMI via the countermeasure interface 216 or UI devices interface 218. The warning may be associated with one or more recommended countermeasures to remediate the fault, failure or detected pest.

The machine learning subsystem 210 (210a, 210b) having a processor 210a (e.g., embedded controller, central processing unit/CPU) and a memory 210b (e.g., non-volatile memory/NVM and/or volatile memory) containing a set of instructions, which when executed by the processor 210a, cause the machine learning subsystem 210 to receive information from one or more other vehicles, and process the received information to determine if pest populations are changing in an area in which the vehicle 100 is located. The machine learning subsystem 210 may communicate with and collect information from subsystems 202-208 (including sensors, devices) and component/interfaces 212-226 in order to provide a deeper understanding of the monitored activities of the subsystems, components and interfaces. The machine learning subsystem 210 may utilize the capabilities of the Monitoring as a Service (MaaS) interface 226 to facilitate the deployment of monitoring functionalities in a cloud environment. The MaaS interface 226 allows the machine learning subsystem 210 to track the states of systems, subsystems, and associated applications, networks, and the like within the cloud. The one or more other vehicles from which the machine learning subsystem receives information may include, for example, vehicles in a user-defined area (e.g., addresses, neighborhoods, zip codes, cities, etc.), vehicles that are owned or shared by the user, vehicles along an upcoming or expected travel route (e.g., based on GPS coordinates), and the like. The received information may allow users to better monitor and recognize patterns and changes in pest populations and activities in monitored areas. The machine learning subsystem 210 may also link to other devices including, for example, smart phones, smart homes, or Internet-of-Things (IoT) devices to provide a warning to a user and to leverage other external cameras or sensors to assist with pest detection, and to recommend potential countermeasures for pest prevention. The machine learning subsystem 210 may thereby expand the capabilities of system 200 by using or leveraging the capabilities of other approved user devices. As an example, warnings and alerts may be provided to the user via an associated smart phone or connected computer. Similarly, smart home devices such as cameras, motion sensors, and other detectors may be used to assist with monitoring pest activity near one or more vehicles (e.g., a garage or parking area), within an associated home, and the like. As a result, the detection capabilities of system 200 are expanded and improved. The machine learning subsystem 210 thereby allows vehicles to function as mobile information collection and sharing nodes that are capable of collecting, sharing and focusing pest related information over wide areas to provide a deeper understanding of pest activity. This information thereby provides users with a better opportunity to plan for, avoid, and remediate pest in and around their vehicles such that costly damage caused by the pests can be reduced or eliminated.

Figure 3:
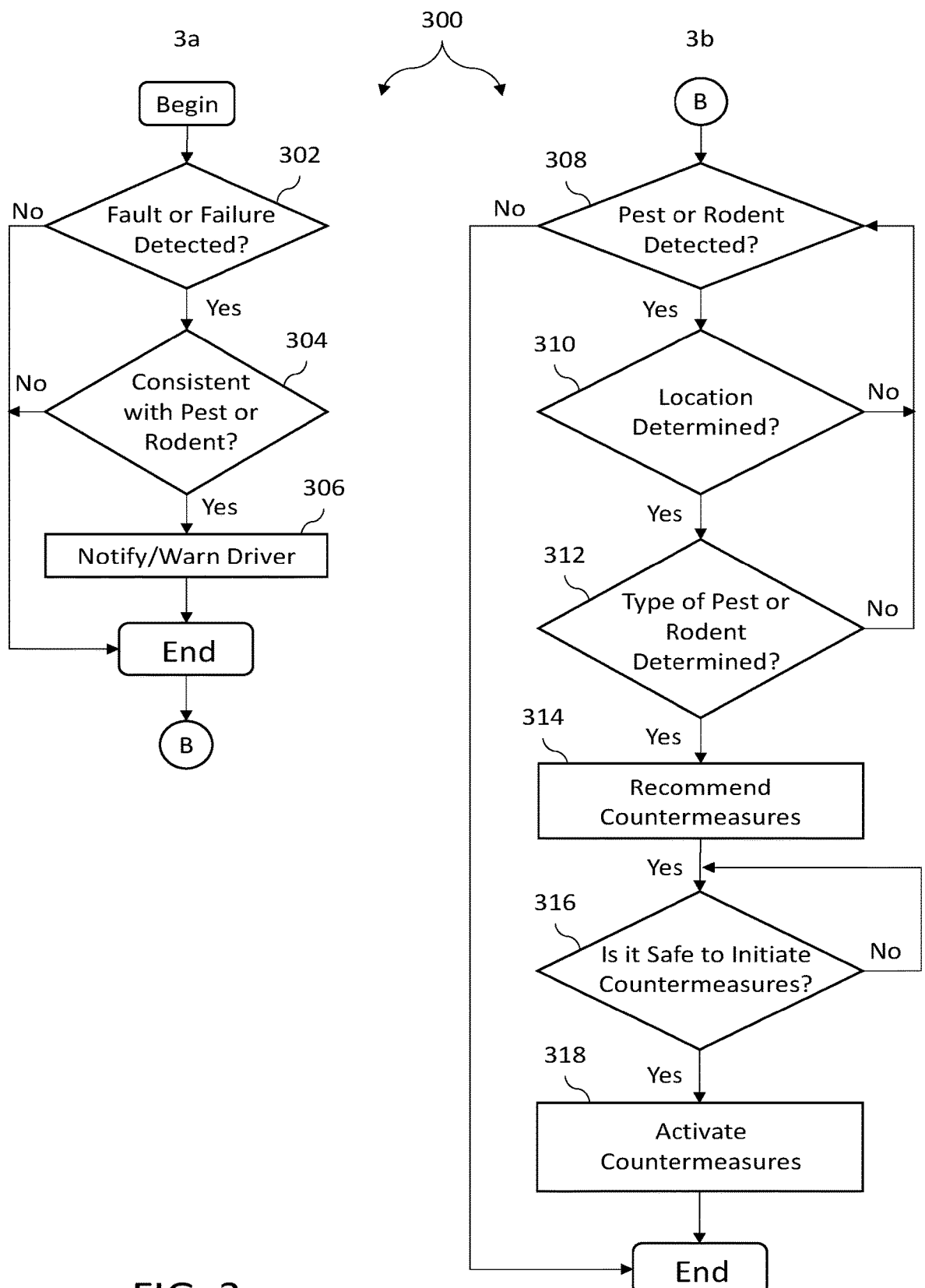
FIG. 3 is a flowchart of an example of a method of operating a vehicle pest detection and eradication system according to an embodiment.

FIG. 3 shows a method 300 of operating a vehicle pest detection and eradication system such as, for example, the system 130 (FIG. 1) and/or the system 200 (FIG. 2). The method 300 may be implemented in logic instructions (e.g., software), configurable logic, fixed-functionality hardware logic, etc., or any combination thereof. Illustrated processing block 302 determines whether a fault or failure has been detected. If so, processing block 304 determines whether the fault or failure is consistent with pest or rodent related damage. If "No" at processing block 306, the fault and failure detection process ends. If "Yes" at processing block 304, processing block 306 provides a notification or warning informing the driver or user of the determination and the fault or failure detection process ends. In an embodiment, the system 300 also performs pest detection and eradication steps. At processing block 308, a determination is made whether one or more pests or rodents have been detected. If "No" at processing block 308, the pest detection and eradication process ends. If "Yes" at processing block 308, at processing block 310 a determination is made of whether the location of the pest or rodent is determined. If "No" at processing block 310, the process returns to processing block 308. If "Yes" at processing block 310, at processing block 312 a determination is made whether the type of pest or rodent is determined (i.e., a category of pest or a specific type of pest is determined). If "No" at processing block 312, the process returns to processing block 308. If "Yes" at processing block 312, at processing block 314 recommended countermeasures are provided to the driver or user. At processing block 316, a determination is made whether it is safe to initiate the recommended countermeasures. This determination may include determining whether the vehicle is locked, whether doors and windows are closed, whether the vehicle is vacant, whether the vehicle is parked, whether the engine compartment is closed and/or locked, and the like. If "No" at processing block 316, the process loops and determines when it is safe to initiate the recommended countermeasures. This step may also include allowing the driver or user to delay the initiation of the countermeasures based on user setting and selections (e.g., a specified time, schedule, upon stopping, upon evacuating the vehicle, etc.). The driver or user may also change, alter, adjust, override and/or cancel the recommended countermeasures. If "Yes" at processing block 316, at processing block 318 the countermeasures are activated and the process terminates. The illustrated process 300 thereby improves safety by allowing for the detection of system faults and failures, and detecting and remediating pests located in or near the vehicle.

Figure 4:
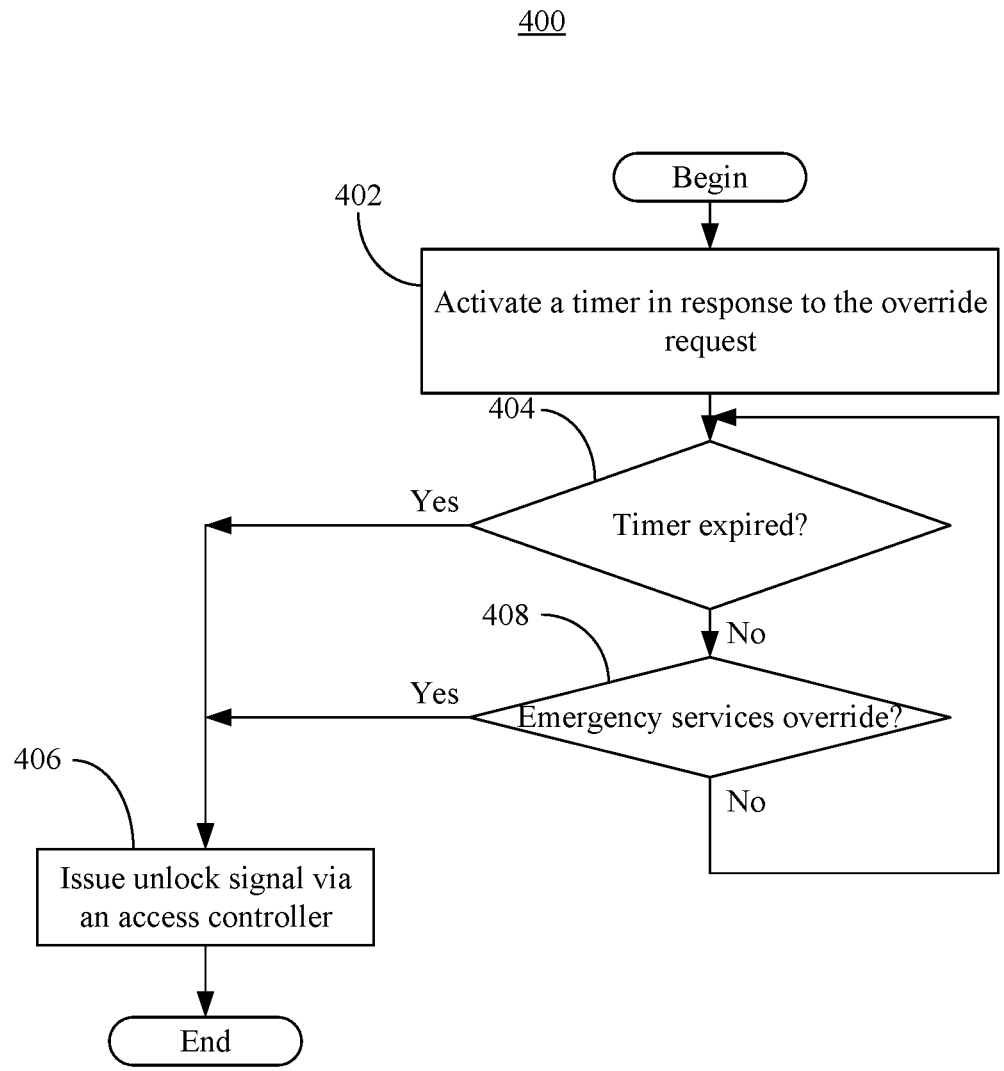
FIG. 4 is a flowchart of an example of a method of maintaining a vehicle in a safe state according to an embodiment.

FIG. 4 shows a method 400 of maintaining a vehicle in a safe state. The method 400 may generally be implemented in a vehicle pest detection and eradication system such as, for example, the system 130 (FIG. 1) and/or the system 200 (FIG. 2). Additionally, the method 400 may be readily substituted for processing block 316 (FIG. 3), already discussed. In an embodiment, the method 400 is implemented in logic instructions (e.g., software), configurable logic, fixed-functionality hardware logic, etc., or any combination thereof. Illustrated processing block 402 activates a timer in response to an override request that is received before expiration of a predetermined cycle time associated with the initiation of countermeasures (i.e., activation of one or more eradication devices) such as eradication devices 160a-160e in vehicle 100. The countermeasures may be initiated, for example, in a passenger cabin, in an engine compartment, near an ECU, and the like. A determination may be made at processing block 404 as to whether the timer has expired. If "Yes" at processing block 404, the illustrated method 400 issues an unlock signal via, for example, a vehicle state interface (e.g. vehicle state interface 222) at processing block 406 and the method 400 terminates. In one example, such as, when a control substance has been used (e.g., with the initiation of control substance system 160e), processing block 404 may also open all windows and turn on an HVAC system to assist with the ventilation of the passenger cabin for a predetermined period of time prior to proceeding to processing block 406 (e.g., as an extra level of safety protection).

If it is determined at processing block 404 that the timer has not expired, illustrated processing block 408 determines whether an emergency services override may exist. In at least one embodiment, the emergency services override may be associated with a need to enter the vehicle in situations that are potentially more harmful than exposure to an eradication device (e.g., exposure to relatively low levels of odorous or nauseous gas when the vehicle is blocking a fire hydrant during a fire). If an emergency services override is detected, the illustrated method 400 proceeds to processing block 406. If no emergency service override is detected, the method 400 may return to processing block 404.

Figure 5:
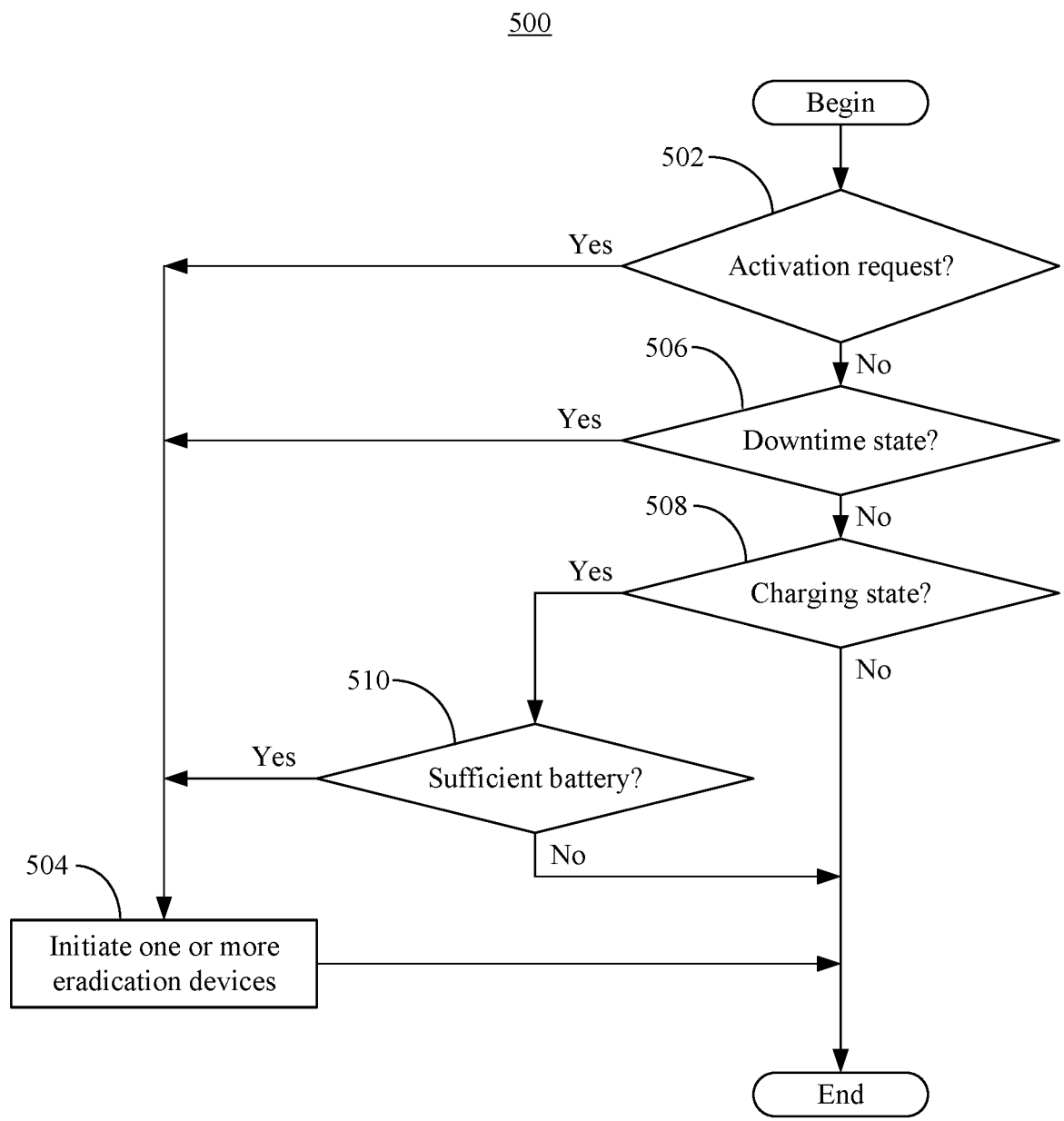
FIG. 5 is a flowchart of an example of a method of uplinking and sharing data according to an embodiment.

FIG. 5 shows a method 500 of controlling the initiation of an eradication. The method 500 may generally be implemented in a vehicle pest detection and eradication system such as, for example, the system 130 (FIG. 1) and/or the system 200 (FIG. 2). In an embodiment, the method 500 is implemented in logic instructions (e.g., software), configurable logic, fixed-functionality hardware logic, etc., or any combination thereof. Illustrated processing block 502 determines whether an activation request for countermeasures (i.e., activation of one or more eradication devices) such as eradication devices 160a-160e has been detected. If "Yes" at processing block 502, processing block 504 triggers initiation of one or more eradication devices such as, for example, the method 400 (FIG. 4), already discussed. If "No" at processing block 502 no activation request is detected, processing block 506 may determine whether the vehicle is in a downtime state (e.g., via the vehicle state interface 222 and/or MaaS subsystem interface 226). If so, the method 500 proceeds to processing block 504 and initiates one or more eradication devices. If the vehicle is not in the Maas downtime state, illustrated processing block 508 determines whether the vehicle is an EV currently in the charging state. If so, a determination is made at processing block 510 as to whether the EV battery level is sufficient to complete the predetermined cycle time. If "Yes" at processing block 510, the method 500 bypasses block 504 and terminates. Otherwise, the method 500 proceeds to block 504 and initiates one or more eradication devices. The method 500 thereby achieves enhanced performance in terms of more facilitates the effective eradication of pests while ensuring occupant safety by automatically identifying eradication opportunities.

The term and phrase "communication" and "in communication", respectively, may be used herein to refer to any type of relationship, direct or indirect, between the systems, subsystems, and components in question, and may apply to electrical, mechanical, fluid, optical, electromagnetic, electromechanical or other connections. In addition, the terms "system" and "subsystem" may be used interchangeably herein and may not be rigidly defined schematically unless otherwise indicated.

Those skilled in the art will appreciate from the foregoing description that the broad techniques of the embodiments of the present disclosure can be implemented in a variety of forms. Therefore, while the embodiments have been described in connection with particular examples thereof, the true scope of the embodiments of the invention should not be so limited since other modifications will become apparent to the skilled practitioner upon a study of the drawings, specification, and following claims.

We claim:

1. A vehicle pest detection and eradication system, the system comprising:
   a fault detection subsystem to detect a fault or failure of an electronic control unit (ECU), wherein the fault or failure is determined to be consistent with a pest-related cause;
   a sensor detection subsystem to detect a presence of one or more pests, wherein the sensor detection subsystem includes one or more of: one or more cameras, one or more LiDAR sensors, one or more RADAR sensors, one or more motion sensors, one or more sound sensors, or one or more heat sensors; and
   an eradication subsystem to provide countermeasures to disable, remove, or eradicate the one or more pests from the vehicle.

2. The system of claim 1, wherein the eradication subsystem includes one or more of:
   one or more lasers to target the one or more small pests;
   an electrical discharge insect control system to exterminate one or more insects; and
   a vibration or sound emission system to target one or more rodents or other large pests.

3. The system of claim 1, wherein the eradication subsystem includes one or more physical barriers to prevent the one or more pests from accessing the ECU, other electrical systems, or physical systems, wherein the one or more physical barriers includes air locks.

4. The system of claim 1, wherein:
   the eradication subsystem includes a control substance system to release a gas, liquid spray, or deterrent material in or around the vehicle, and
   the control substance system is to be activated only after a user lockout is initiated, and to ventilate the vehicle for a period of time before the user lockout is terminated.

5. The system of claim 1, further comprising a warning system to warn a driver of a presence and a severity of the one or more pests, wherein the severity is to be used to determine a response including one or more of the countermeasures.

6. The system of claim 1, further comprising:
   a machine learning module to:
      receive information from one or more vehicles; and
      process the received information to determine if pest populations are changing in an area in which the vehicle is located.

7. The system of claim 6, wherein the machine learning module is further to:
   warn one or more other vehicles of the presence of pests in the area;
   link to other devices, the other devices including a smart phone, a smart home, or an Internet-of-Things (IoT) device to provide a warning to a user and to utilize other external cameras or sensors to assist with pest detection; and
   recommend potential countermeasures for pest prevention.

8. At least one computer readable storage medium comprising a set of instructions, which when executed by a computing device, cause the computing to:
   detect, via a fault detection subsystem, a fault or failure of an electronic control unit (ECU), wherein the fault or failure is determined to be consistent with a pest-related cause;
   detect, via a sensor detection subsystem, the presence of one or more pests, wherein the sensor detection subsystem includes one or more of: one or more cameras, one or more LiDAR sensors, one or more RADAR sensors, one or more motion sensors, one or more sound sensors, or one or more heat sensors; and
   provide, via an eradication subsystem, countermeasures to disable, remove or eradicate the one or more pests from the vehicle.

9. The at least one computer readable storage medium of claim 8, wherein the instructions, when executed, cause the computing device to:
   target the one or more small pests via one or more lasers;
   exterminate insects via an electrical discharge insect control system; or
   target one or more rodents or other large pests via a vibration or sound emission system.

10. The at least one computer readable storage medium of claim 8, wherein the instructions, when executed, cause the computing device to prevent pests from accessing the ECU or other electrical systems via one or more physical barriers, wherein the one or more physical barriers includes air locks.

11. The at least one computer readable storage medium of claim 8, wherein:
the instructions, when executed, cause the computing device to release a gas, liquid spray, or deterrent material in or around the vehicle via a control substance system,
the control substance system is to be activated only after a user lockout is initiated, and to ventilate the vehicle for a period of time before the user lockout is terminated.

12. The at least one computer readable storage medium of claim 8, wherein the instructions, when executed, cause the computing device to warn the driver of a presence and a severity of one or more pests via a warning system, wherein the severity is to be used to determine a response including one or more suggested countermeasures.

13. The at least one computer readable storage medium of claim 8, wherein the instructions, when executed, cause the computing device to:
receive information from one or more vehicles; and
process the received information to determine if pest populations are changing in the defined area.

14. The at least one computer readable storage medium of claim 13, wherein the instructions, when executed, cause the computing device to:
warn one or more other vehicles of the presence of pests in the defined area;
link to other devices including a smart phone, a smart home, or an Internet-of-Things (IoT) device to provide a warning to a user and to utilize other external cameras or sensors to assist with pest detection; and
recommend potential countermeasures for pest prevention.

15. A method of operating a vehicle pest detection and eradication system comprising:
detecting, via a fault detection subsystem, a fault or failure of an electronic control unit (ECU), wherein the fault or failure is determined to be consistent with a pest-related cause;
detecting, via a sensor detection subsystem, the presence of one or more pests, wherein the sensor detection subsystem includes one or more of: one or more cameras, one or more LiDAR sensors, one or more RADAR sensors, one or more motion sensors, one or more sound sensors, or one or more heat sensors; and
providing, via an eradication subsystem, countermeasures to disable, remove or eradicate the one or more pests from the vehicle.

16. The method of claim 15, including at least one of:
targeting the one or more small pests via one or more lasers;
exterminating insects via an electrical discharge insect control system powered by the vehicle; and
targeting one or more rodents or other large pests via a vibration or sound emission system.

17. The method of claim 15, comprising preventing pests from accessing the ECU or other electrical systems via one or more physical barriers, wherein the one or more physical barriers includes air locks.

18. The method of claim 15, comprising releasing a gas, liquid spray or deterrent material in or around the vehicle, wherein the control substance system is to be activated only after a user lockout is initiated, and to ventilate the vehicle for a period of time before the user lockout is terminated.

19. The method of claim 15, comprising warning the driver of a presence and a severity of one or more pests, wherein the severity is to be used to determine a response including one or more suggested countermeasures.

20. The method of claim 15, comprising:
receiving information from one or more vehicles;
processing the received information to determine if pest populations are changing in a defined area;
warning one or more other vehicles of the presence of pests in the defined area;
linking to other devices including a smart phone, a smart home, or an Internet-of-Things (IoT) device to provide a warning to a user and to utilize other external cameras or sensors to assist with pest detection; and
automatically determining potential countermeasures for pest prevention.

* * * * *